Nov. 9, 1971  F. ZUURVEEN  3,618,210
DRY-SHAVING APPARATUS HAVING A DEFORMABLE CURVED SHEAR PLATE
Original Filed Sept. 6, 1967  3 Sheets-Sheet 1

INVENTOR.
FRANS ZUURVEEN
BY
AGENT

United States Patent Office 3,618,210
Patented Nov. 9, 1971

3,618,210
DRY-SHAVING APPARATUS HAVING A DEFORMABLE CURVED SHEAR PLATE
Frans Zuurveen, Emmasingel, Eindhoven, Netherlands, assignor to U.S. Philips Corporation, New York, N.Y.
Continuation of application Ser. No. 665,850, Sept. 6, 1967. This application July 18, 1969, Ser. No. 849,553
Claims priority, application Netherlands, Sept. 13, 1966, 6612851
Int. Cl. B26b 19/16
U.S. Cl. 30—43.6                                10 Claims

ABSTRACT OF THE DISCLOSURE

A dry shaver having a thin, resilient shear plate that is formed into a partial toroid and has a plurality of hair-receiving apertures, a cutter which moves about substantially the entire surface of the shear plate, and means for maintaining the cutting surface in pressure contact therewith.

---

This is a continuation of application Ser. No. 665,850, filed Sept. 6, 1967, now abandoned.

The invention relates to a dry-shaving apparatus having a thin elastic arcuate shear plate provided with hair-inlet apertures and a movable cutting member which is operative below said plate and is adapted to rotate or to vibrate, the shear plate and cutting member being pressed against each other.

In a known embodiment of a dry-shaving apparatus having a rotating cutting member, a shear plate is made from the steel blank. In order to ensure a sufficient rigidity of such essentially flat shear plates, the part of the shear plate which is made sufficiently thin to obtain a satisfactory shaving result covers a comparatively low percentage of the total surface area of the shear plate. Such shear plates have the further disadvantage that the manufacture requires a great accuracy and many operations and that the shear plate can be locally machined only to a limited degree of thinness.

In another known embodiment of a dry-shaving apparatus having a rotating cutting member, the shear plate consists of a thin flat elastic essentially circular foil which is arranged so that it is tautly stretched. In this embodiment, the whole surface of the shear plate can be made thin so that it can be entirely utilized for shaving. This kind of shear plate has the disadvantage, however, that the diameter of the shear plate cannot be large in view of the very high stresses required for tautly stretching it. This arrangement is provided in order to obtain a satisfactory engagement between the cutting member and the shear plate, since otherwise hairs are liable to be pinched between the shear plate and the cutting member, and give rise to skin injuries. In order that the shear plate may be kept completely flat, these stresses must theoretically even be infinitely large, which can be clearly understood.

Certain known dry-shaving apparatus have shear plates with very large operative surfaces. Such apparatus have a cutting member moving in a reciprocatory manner and provided with a thin elastic arcuate shear plate which is slipped over the cutting member in the form of part of a cylinder and is secured at two ends to the housing. All the dry-shaving apparatus of the kind having a cutting member moving in a reciprocatory manner have the disadvantages, that vibrations are provided due to the periodic nature of the movement of the cutting member, and that the shaving time becomes longer than where the cutting member constantly operates at its maximum speed. Moreover, when the cutting member is in the proximity of one of the dead points, the hairs which at this instant are in contact with the shear plate and the cutting member are subjected to a pulling force, since during shaving, the whole shaving apparatus is moved with respect to the face.

In any of the known embodiments of dry-shaving apparatus the shape of the shear plate cannot match satisfactorily the shape of the face which has convex as well as concave and flat parts. Also the other aforesaid disadvantages inherent in known embodiments of dry-shaving apparatus are not avoided.

The invention has for its object to provide a dry-shaving apparatus provided with a thin elastic arcuate shear plate having both in a relative and in an absolute sense a large operative surface of a shape such that it can match satisfactorily convex as well as concave and flat parts of the face, while this shaving apparatus also can operate without vibrations and at maximum speed.

According to the invention, the surface of the thin elastic arcuate shear plate has a shape obtained by rotation about an axis of a curved line portion which is not intersected by the axis of rotation so that the shaving surface forms part of a toroidal surface.

The starting material for the shear plate may consist of a thin elastic preferably flat circular plate which is provided with a concentric round aperture and may have a thickness of, for example, 0.07 mm. This can be manufactured by the method commonly used to obtain the thin elastic shear plates of the aforesaid known dry-shaving apparatus having a cutting member moving in a reciprocatory manner and by other methods. This shear plate is shaped into a toroidal form by stretching it over a likewise toroidal cutting member, while the outer edge and the peripheral edge of the concentric aperture (referred to hereinafter as inner edge) are both suitably secured to fixed parts of the housing of the dry-shaving apparatus or bear thereon and the required force is transmitted with or without the use of one or more separate resilient members to the housing of the dry-shaving apparatus.

According to a feature of the invention, the hair-inlet apertures in the shear plate are in the form of gaps which start on either side of a narrow continuous ring of material extending across the highest part of the toroidal surface and which are extended continuously in a radial direction as far as the outer edge and the inner edge of the shear plate. Owing to this step, the contact pressure required for obtaining the toroidal form of the shear plate may be lower, while nevertheless the cohesion of the shear plate remains comparatively large.

In another embodiment, part of the hair-inlet apertures in the shear plate have the form of gaps which start at a continuous ring of material constituting the inner edge of the shear plate and which are continuously extended in a radial direction as far as the outer edge, further gaps being disposed between these gaps which start approximately at the highest part of the toroidal surface and are continuously extended in a radial direction as far as the outer edge or as far as the continuous ring of material constituting the inner edge of the shear plate.

In another embodiment in which the cutting member is adapted to rotate in one direction and to co-operate with one of the two aforementioned types of shear plate, said cutting member is provided with knives which start on either side of a narrow continuous ring of material located at the highest part of the upper side of the cutting member and which are continuously extended as far as the inner edge and the outer edge of the cutting member. The knives extending from the narrow continuous ring of material as far as the inner edge are orientated along straight tangents of a circle concentric to the axis of rotation of the cutting member and the knives extending from the narrow continuous ring of material as far as the outer edge are orientated along tangents of another circle concentric to the axis of rotation of the cutting member, the former lines extending, viewed from the relevant tangential circle, in the direction of rotation of the cutting member and the latter lines extending in a direction opposite the direction of rotation. This step has for its object to attain a smoother run of the knives along the laminations.

The invention will now be described more fully with reference to the drawing, which shows an embodiment of the invention and in which.

Figure 1:
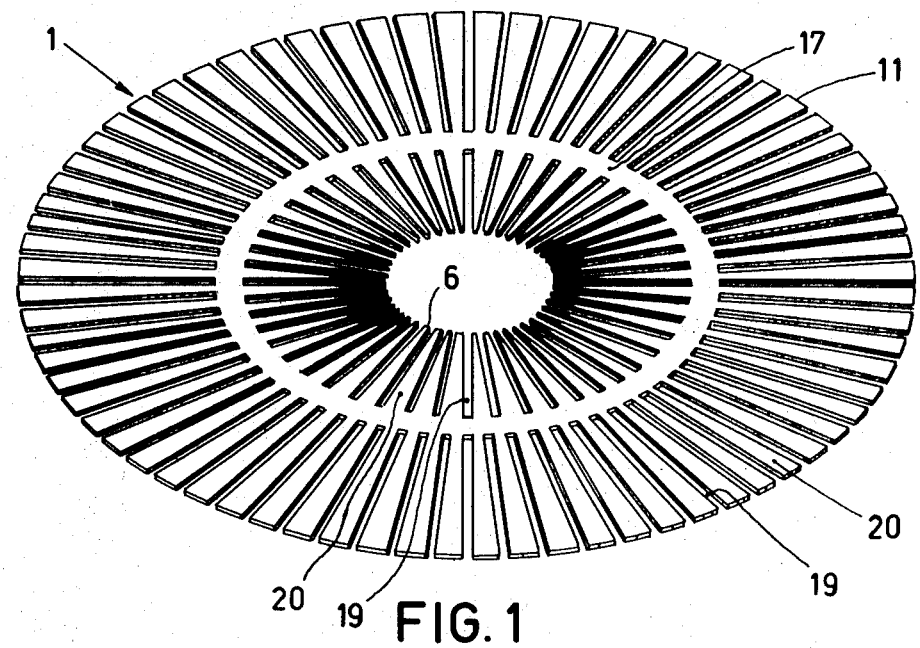
FIG. 1 is a perspective view of a shear plate according to the invention which is not stretched.

In the figures, reference numeral 1 designates a shear plate which is preferably flat in the non-stretched state as shown in FIG. 1. A cutting member 2 has a shape such that in the mounted state shown in FIG. 2 the shear plate assumes the desired arcuate form under the influence of the force exerted by one end of a spring 3 through a ball-bearing 4 on the cutting member and then on the shear plate. The other end of the spring 3 bears on the housing 5 of the dry-shaving apparatus. The inner edge 6 of the shear plate is pressed by means of a pressure member 7 and a screw 8 against a projecting part 9 of the housing. The shapes of the pressure member 7 and of the space 10 inside the projecting part 9 are chosen so that the inner edge 6 of the shear plate 1 is under the correct clamping conditions to ensure a satisfactory engagement between the shear plate and the cutting member 2. The outer edge 11 of the shear plate bears on the ring 18 which may be secured to the housing 5, for example, by means of a bayonet joint (not shown). The housing 5 accommodates an electric motor 12 which drives the cutting member provided with a toothed rim 16 by means of gearwheels 13, 14, 15.

Figure 2:
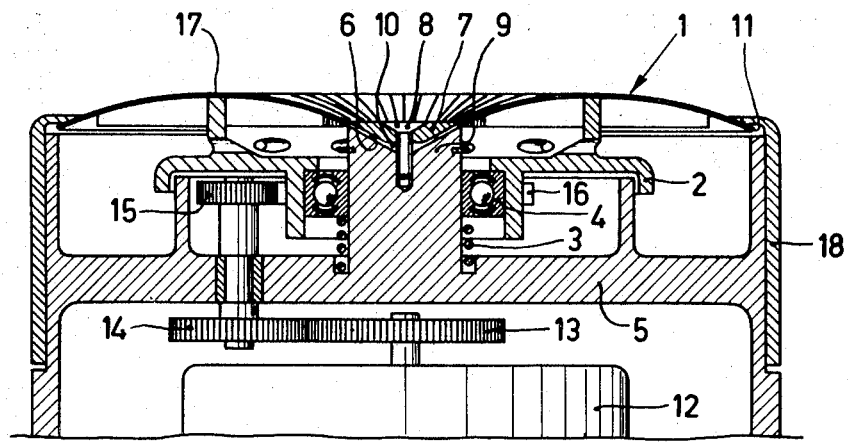
FIG. 2 is a sectional view of a shaving head according to the invention in the mounted state.

The shear plate shown in FIG. 1, which is flat in the unmounted state, has a narrow continuous ring of material 17 which extends over the highest part of the toroidal surface of the shear cutter 2 when the shear plate is stretched, as shown in FIG. 2. Radial gaps or hair-receiving apertures or slits 19 are located on either side of this ring so that laminations or strips 20 are formed. Owing to this design, the shear plate can be shaped into the desired form with a comparatively small force and nevertheless continues to exhibit a comparatively large cohesion.

Figure 3:
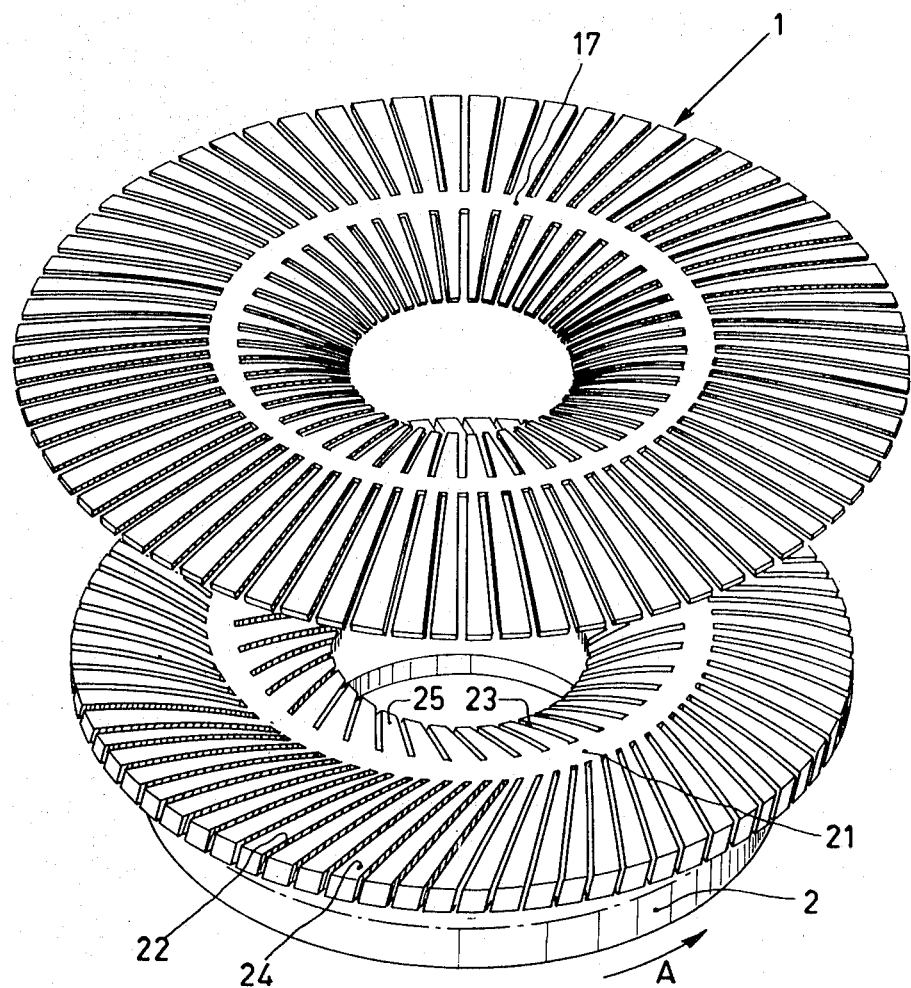
FIG. 3 is a perspective view of a cutting member and a shear plate deformed by the cutting member.

FIG. 3 is a perspective view of the same shear plate, which now is arcuate, while the cutting member 2 is located below it. In this embodiment of the cutting member, provision is made of a ring 21 which corresponds to the ring 17 of the shear plate 1 and on either side of which are located gaps 22 and 23 so that knives 24 and 25 are formed. This type of cutting member is adapted to rotate in one direction, i.e. in the direction indicated by an arrow A. The gaps 22 and 23 are arranged so that the knives have cutting edges which are at a relative acute angle. The knives extend tangentially to a circle concentric to the axis of rotation of the cutting member, the knives 24 being tangential to another circle while the knives 25, while viewed from the respective tangential circles the knives 24 moreover extend in a direction opposite the direction of rotation A and the knives 25 extend in this very direction. Thus, a smoother run of the knives along the laminations is obtained, since the knives invariably first contact the laminations of the shear plate at the continuous ring 17 and not at the free ends of the laminations at the inner and the outer edge. This would not be the case if the shear cutter 2 should rotate in a direction opposite the direction A, in which event the knives would be liable to abut against the extremities of the laminations at the inner and the outer edge due to inevitable differences in height between the knives.

Figure 4:
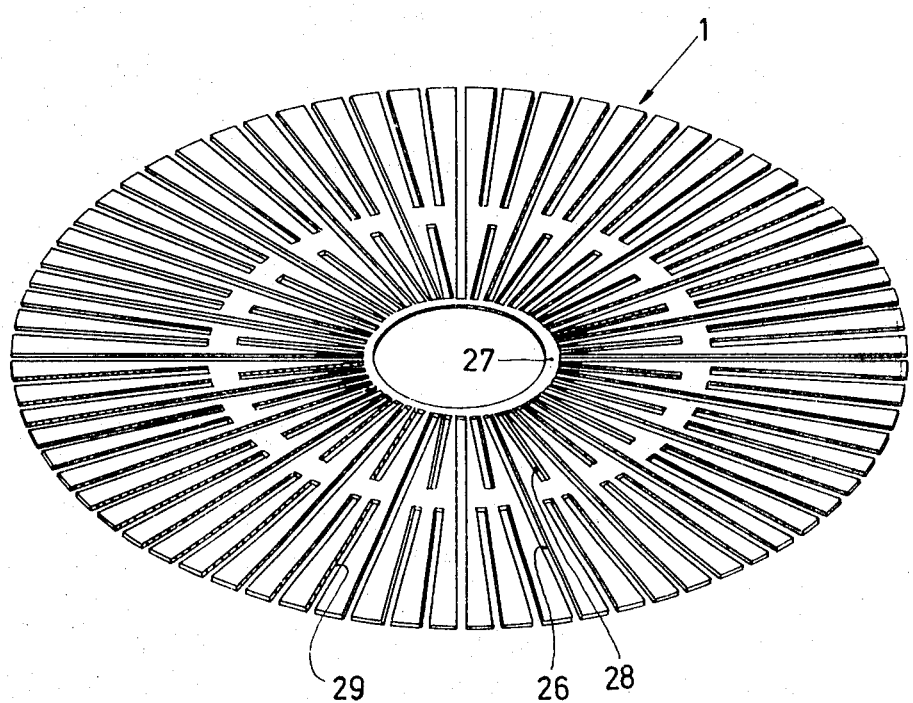
FIG. 4 is a perspective view of another embodiment of a shear plate which is not stretched.

FIG. 4 shows another embodiment of a shear plate which is flat in the unmounted state. Gaps 26 are provided which extend continuously in a radial direction from a rim 27 of material constituting the inner edge as far as the outer edge. Further gaps 28 and 29 are provided in the material between the gaps 26; however, these gaps only extend from the ring 27 or the outer edge as far as approximately the highest part of the toroidal surface. This embodiment of the shear plate affords the advantage that the plate can be more readily deformed and can match more satisfactorily the shape of the shear cutter. However, the shear plate has now become more vulnerable, since the only cohesion left between the parts of the shear plate which are separated from each other by the continuous gaps 26 is obtained by the inner edge 27. This inner edge is proportioned so that, when the shear plate is mounted in the shaving apparatus, it does not break due to the deformation to which it is subjected.

I claim:

1. A dry shaver comprising: a housing inclding a circular outer rim and a support situated at the center of the rim, a relatively thin, flexible and resilient generally circular shear plate mounted in said housing and flexed into a partial toroid shape, the plate having a shear surface on one side, inner and outer edges, a continuous annular part, and a plurality of spaced finger parts extending generally radially and defining between them a plurality of hair-receiving apertures, the ends of said spaced fingers thus defining a discontinuous edge, a rotatable cutter member having a cutting surface which includes a plurality of spaced apertures and which defines a partial toroid, means for rotating the cutting member, and means for urging the cutter axially toward the shear plate for maintaining the cutting and shear surfaces in pressure contact, the inner edge of the plate being fixedly secured to said housing center support, and the outer edge of the plate being slidably engaged to said housing rim, with said fingers being radially movable.

2. A dry shaver comprising: a housing including a circular outer rim and a support situated at the center of the rim, a relatively thin, flexible and resilient generally circular shear plate mounted in said housing and flexed into a partial toroid shape, the plate having a shear surface on one side, inner and outer edges, a continuous annular part, and a plurality of spaced finger parts extending generally radially and defining between them a plurality of hair-receiving apertures, the ends of said spaced fingers thus defining a discontinuous edge, a rotatable cutter member including an annular part and a plurality of spaced knives having cutting surfaces that extend from the annular part inwardly and outwardly at acute angles relative to said generally radially extending slits of the shear plate having a cutting surface which includes a plurality of spaced apertures and which defines a partial toroid, means for rotating the cutting member, and means for urging the cutter axially toward the shear plate for maintaining the cutting and shear surfaces in pressure contact, the inner edge of the plate being fixedly secured to said housing center support, and the outer edge of the plate being slidably engaged to said housing rim, with said fingers being radially movable.

3. A dry shaver comprising: a housing including a circular outer rim and a support situated at the center of the rim, a relatively thin, flexible and resilient generally circular shear plate mounted in said housing and flexed into a partial toroid shape, the plate having a shear surface on one side, a discontinuous outer edge, a continuous inner edge, and a plurality of spaced finger parts extending generally radially outward defining between them a plurality of hair-receiving apertures, the ends of said spaced fingers thus defining said discontinuous edge, each of said spaced finger parts having an inner end forming part of said inner edge, an outer end, and a center part intermediate its inner and outer ends, each finger defining along its length one hair-receiving slit extending from said inner end to the center part and two spaced similar slits extending from the center part to the outer end, the plurality of center parts defining a discontinuous annular ring disposed at the highest part of the toroidal surface when the shear plate is upright, a rotatable cutter member having a cutting surface which includes a plurality of spaced apertures and which defines a partial toroid, means for rotating the cutting member, and means for urging the cutter axially toward the shear plate for maintaining the cutting and shear surfaces in pressure contact, the inner edge of the plate being fixedly secured to said housing center support, and the outer edge of the plate being slidably engaged to said housing rim, with said fingers being radially movable.

4. A shear plate for use with a dry shaver, the plate formed of a single, flexible and resilient annular sheet having a continuous inner edge and a discontinuous outer peripheral edge, and a plurality of spaced finger parts (i) extending generally radially outward from the inner ring and (ii) defining between them hair-receiving slits, the plate being flexible to form a partial toroid with the ends of the finger parts defining said discontinuous peripheral edge, each finger having an inner end forming part of said inner edge, an outer end, and a center part intermediate its inner and outer ends, each finger defining along its length one auxiliary hair-receiving slit extending from said inner end to the center part and two spaced similar slits extending from the center part to the outer end, the plurality of center parts defining a discontinuous annular ring disposed at the highest part of the toroidal surface when the shear plate is upright.

5. A dry shaver comprising
(a) a housing,
(b) a relatively thin, flexible and resilient shear plate mounted in said housing, the plate having a plurality of hair-receiving apertures and on one side a shear surface, the plate being resiliently flexible to form only a single partial toroid and being resiliently flexed from a generally planar, non-toroid shape to define a single partial toroid,
(c) means in the housing for maintaining the plate resiliently flexed in the toroid shape,
(d) a rotatable cutter member having a cutting surface (i) which includes a plurality of spaced apertures and (ii) which defines a single partial toroid corresponding to that of the shear plate,
(e) means for urging the cutter toward the shear plate for maintaining the cutting and shear surfaces in pressure contact, and
(f) means for rotating the cutting member.

6. A shaver as defined in claim 1 wherein said plate has inner and outer edges and comprises a continuous annular part and a plurality of spaced finger parts extending generally radially from the annular part and defining between them said apertures as spaced slits, the ends of said spaced finger parts defining at least one of said edges which is thus discontinuous.

7. A shaver as defined in claim 6 wherein said annular part is intermediate the inner an douter edges of the plate, said spaced finger parts extend both inwardly and outwardly from the annular part, both the inner and outer edges of the plate thus being discontinuous.

8. A dry shaver as defined in claim 6 wherein said housing comprises a circular rim and a support situated at the center of the rim, the plate's outer and inner edges being engaged to the housing's rim and support respectively.

9. A shaver as defined in claim 2, wherein said cutter is rotatable in a predetermined direction, and said knives' cutting surfaces extend at angles rearward of said direction of rotation.

10. A shaver as defined in claim 6 wherein said annular part defines the inner edge of the plate, and said finger parts extend radially outward.

References Cited
UNITED STATES PATENTS

| | | |
|---|---|---|
| 2,632,948 | 3/1953 | Konrad. |
| 2,816,358 | 12/1957 | Vivie _____ 30—43.6 |
| 2,349,487 | 5/1944 | Davis _____ 151—35 UX |
| 2,749,681 | 6/1956 | Reidenbach _____ 51—209 X |

ROBERT C. RIORDON, Primary Examiner

U.S. Cl. X.R.

30—346.51